US008110023B2

(12) United States Patent
Mak et al.

(10) Patent No.: US 8,110,023 B2
(45) Date of Patent: Feb. 7, 2012

(54) CONFIGURATIONS AND METHODS FOR OFFSHORE LNG REGASIFICATION AND BTU CONTROL

(75) Inventors: John Mak, Santa Ana, CA (US); Curt Graham, Mission Viejo, CA (US)

(73) Assignee: Fluor Technologies Corporation, Aliso Viejo, CA (US)

( * ) Notice: Subject to any disclaimer, the term of this patent is extended or adjusted under 35 U.S.C. 154(b) by 599 days.

(21) Appl. No.: 11/721,226

(22) PCT Filed: Dec. 13, 2005

(86) PCT No.: PCT/US2005/045455

§ 371 (c)(1),
(2), (4) Date: Jul. 1, 2009

(87) PCT Pub. No.: WO2006/066015

PCT Pub. Date: Jun. 22, 2006

(65) Prior Publication Data

US 2009/0277219 A1 Nov. 12, 2009

Related U.S. Application Data

(60) Provisional application No. 60/636,960, filed on Dec. 16, 2004.

(51) Int. Cl.
*B01D 53/14* (2006.01)
*F25J 1/00* (2006.01)

(52) U.S. Cl. ............... 95/237; 96/243; 585/802; 62/613

(58) Field of Classification Search .................... 95/237; 96/243; 585/800, 802, 833; 62/613, 913
See application file for complete search history.

(56) References Cited

U.S. PATENT DOCUMENTS

| | | | | |
|---|---|---|---|---|
| 6,564,579 | B1 | 5/2003 | McCartney | |
| 7,600,396 | B2 * | 10/2009 | Mak | 62/620 |
| 2003/0005698 | A1 | 1/2003 | Keller | |
| 2003/0177785 | A1 | 9/2003 | Kimble et al. | |
| 2008/0190135 | A1 * | 8/2008 | Mak | 62/613 |

* cited by examiner

*Primary Examiner* — Frank Lawrence, Jr.
(74) *Attorney, Agent, or Firm* — Fish & Associates, PC

(57) ABSTRACT

LNG is pumped to supercritical pressure and vaporized, preferably in an offshore location to thereby form a natural gas stream with an intermediate temperature. A first portion of that stream is then processed in an onshore location to remove at least some non-methane components to thereby form a lean LNG, which is then combined with a second portion of that stream to form a sales gas having desired chemical composition. The intermediate temperature and the split ratio of the gas stream in first and second portion are a function of the concentration of the non-methane components in the LNG.

20 Claims, 2 Drawing Sheets

CONFIGURATIONS AND METHODS FOR OFFSHORE LNG REGASIFICATION AND BTU CONTROL

This application claims priority to our copending U.S. provisional patent application with the Ser. No. 60/636,960, filed Dec. 16, 2004, and which is incorporated by reference herein.

FIELD OF THE INVENTION

The field of the invention is natural gas processing, especially as it relates to LNG (liquefied natural gas) regasification and processing in a combined on-/offshore facility.

BACKGROUND OF THE INVENTION

Offshore LNG regasification has become an increasingly attractive option in LNG import. Among other advantages, offshore regasification terminals or terminals in a relatively remote location help to reduce various safety and security concerns of local communities nearby a terminal that would otherwise be onshore or in a location near human habitation and/or activity.

Unfortunately, offshore installations are generally significantly more expensive than onshore installations, and numerous additional technical challenges arise from offshore LNG storage, unloading and regasification. Several solutions have recently been proposed to overcome at least some of these difficulties. However, all or almost all of the presently known offshore configurations fail to provide a mechanism by which chemical composition of the LNG can be altered to a desirable composition (e.g., processing of lower quality LNG with heating values higher than the North American pipeline specifications). As pipeline transport of natural gas in North America and other countries must typically meet hydrocarbon dew point and gross heating value requirements of the associated distribution systems, presence of heavier components in LNG is generally not desirable.

In many presently known configurations, heavy hydrocarbons are removed from LNG in a process that includes vaporizing the LNG in a demethanizer using a reboiler, and recondensing the demethanizer overhead to a liquid that is then pumped and vaporized. For example, McCartney describes in U.S. Pat. No. 6,564,579 such regasification process and configurations. While these configurations and methods typically operate satisfactorily under onshore conditions, offshore installation would be unacceptable under most scenarios as these configurations require relatively substantial space.

In currently known offshore LNG regasification terminals, LNG is typically heated to pipeline specification (e.g., about 50° F. and 1200 psig) in offshore vaporizers using seawater or submerged combustion vaporizers. Commonly, fractionation facilities are not provided due to the space limitation in an offshore environment, and the regasified LNG is then sent via an undersea pipeline to an onshore consumer gas pipeline. Thus, while offshore regasification is realized, change in chemical composition is typically not possible using such configurations. It should be noted that when the LNG is fully vaporized, BTU reduction and/or recovery of non-methane components (e.g., ethane, propane, etc.) is generally not economical as these processes would require significant refrigeration and recompression. Consequently, and at least for these reasons, only high quality LNG with acceptable heating value content and/or desirable chemical composition are imported, while lower quality LNG (e.g., LNG with relatively high BTU) is often rejected.

Thus, while numerous configurations and methods to separate heavier components from LNG or to reduce BTU of LNG are known in the art, all or almost all of them fail to provide economically attractive operation, especially in an offshore environment. Therefore, there is still a need to provide improved configurations and methods for LNG regasification that allows for simple and cost-effective removal of non-methane components to thereby produce LNG with a desirable BTU and/or chemical composition.

SUMMARY OF THE INVENTION

The present invention is directed to configurations and methods in which LNG is first pumped to supercritical pressure and then vaporized, preferably in an offshore vaporizer or a vaporizer that is in a location that is remote (e.g., more than 1 km) from a populated area, to a temperature that is a function of the concentration of non-methane components in the LNG (e.g., between about −20° F. to about 15° F.). The so formed supercritical vaporized natural gas is then transported to an onshore facility and split into a first and second portion, wherein the split ratio is once more a function of the concentration of non-methane components in the LNG.

The first portion is then processed to remove at least some non-methane components from the natural gas. Most preferably, work is produced by expanding the regasified natural gas to thereby power recompression of the lean natural gas, which is then combined with the second portion to thereby form a processed LNG.

In one aspect of the inventive subject matter, a method of providing a natural gas product includes a step in which vaporized supercritical LNG is provided, most preferably from offshore to an onshore terminal. In another step, the vaporized supercritical LNG is split into a first and second stream, wherein the first stream is processed to remove at least some non-methane components from the first stream to form a lean natural gas product, and wherein the step of processing further includes a first turbo-expansion of at least a portion of the first stream. In yet another step, the lean natural gas product is compressed using at least in part energy from the first turbo-expansion, and the compressed lean natural gas product is then combined with the second stream to thereby form a sales gas with predetermined content of non-methane components.

Preferably, the vaporized supercritical LNG is at a predetermined temperature and split ratio between first and second streams is at a predetermined ratio, wherein both the temperature and ratio are a function of a concentration of non-methane components in the LNG. It is further preferred that in such methods the first stream is processed in an absorber that further produces an absorber bottom product, wherein the bottom product is further processed in at least one downstream column (typically operated at a lower pressure than the absorber pressure) to produce at least one of an ethane product and a propane-containing product. In at least some of such configurations, it is preferred that the downstream column is operated as a demethanizer and provides an overhead product to the absorber as a reflux stream and/or a bottom feed stream. A second turbo-expansion may be included that expands at least a portion of the first stream, wherein the first turbo-expansion provides reflux condenser duty, and wherein the second turbo-expansion provides refrigeration duty in the absorber.

Accordingly, it is contemplated that an offshore facility may include a source of LNG (e.g., LNG carrier, submerged or floating LNG tank) and a pump fluidly coupled to the source, wherein the pump pumps LNG to supercritical pressure. A regasification unit (e.g., open rack seawater vaporizer, submerged combustion fuel fired vaporizer, intermediate fluid vaporizer, and/or Rankine cycle vaporizer) is then coupled to the pump and operated to regasify the supercritical LNG to a predetermined temperature (about −20° F. to about 20° F.), wherein a controller is operationally linked with the regasification unit and enabled to set the temperature of the regasified LNG as a function of the concentration of non-methane components in the LNG. Most preferably, the controller comprises a central processing unit programmed to control the temperature as a function of previously provided information on chemical composition of the LNG.

In another aspect of the inventive subject matter, a LNG processing plant includes an onshore or offshore portion that is configured to pump LNG to supercritical pressure and to regasify the pressurized LNG. An onshore portion of such plants is configured to process one portion of the regasified LNG to remove at least some non-methane content in the LNG to thereby form a lean natural gas product, wherein the onshore portion is configured to produce a sales gas from the lean natural gas product and another portion of the regasified LNG. Typically, the onshore portion comprises an absorber that receives the one portion of the regasified LNG to thereby produce the lean regasified. Similar to configurations above, contemplated plants include a turbo-expander that expands the one portion of the regasified LNG before entry into the absorber, and still further include a compressor coupled to the expander and compresses the lean natural gas product. A downstream column will typically be configured to receive an absorber bottom product and to produce an ethane and propane-containing product, or may be configured as a demethanizer to receive an absorber bottom product and to produce a reflux stream and/or a bottom feed stream to the absorber.

Viewed from another perspective, contemplated plants may include a source (e.g., onshore or offshore) that provides regasified LNG at supercritical pressure, wherein the LNG has a first quantity of non-methane components. An onshore flow divider may be provided that produces a first and a second stream from the regasified LNG, and an onshore absorber is configured to produce a lean natural gas product from a turbo-expanded portion of the first stream. An onshore compressor will then compress the lean natural gas product, wherein the compressor uses energy from the turbo-expansion of the first stream. An onshore flow combining element is configured to produce a sales gas from the compressed lean natural gas product and the second stream, wherein the sales gas has a quantity of non-methane components that is less than the first quantity.

Various objects, features, aspects and advantages of the present invention will become more apparent from the following detailed description of preferred embodiments of the invention.

DETAILED DESCRIPTION

Figure 1:
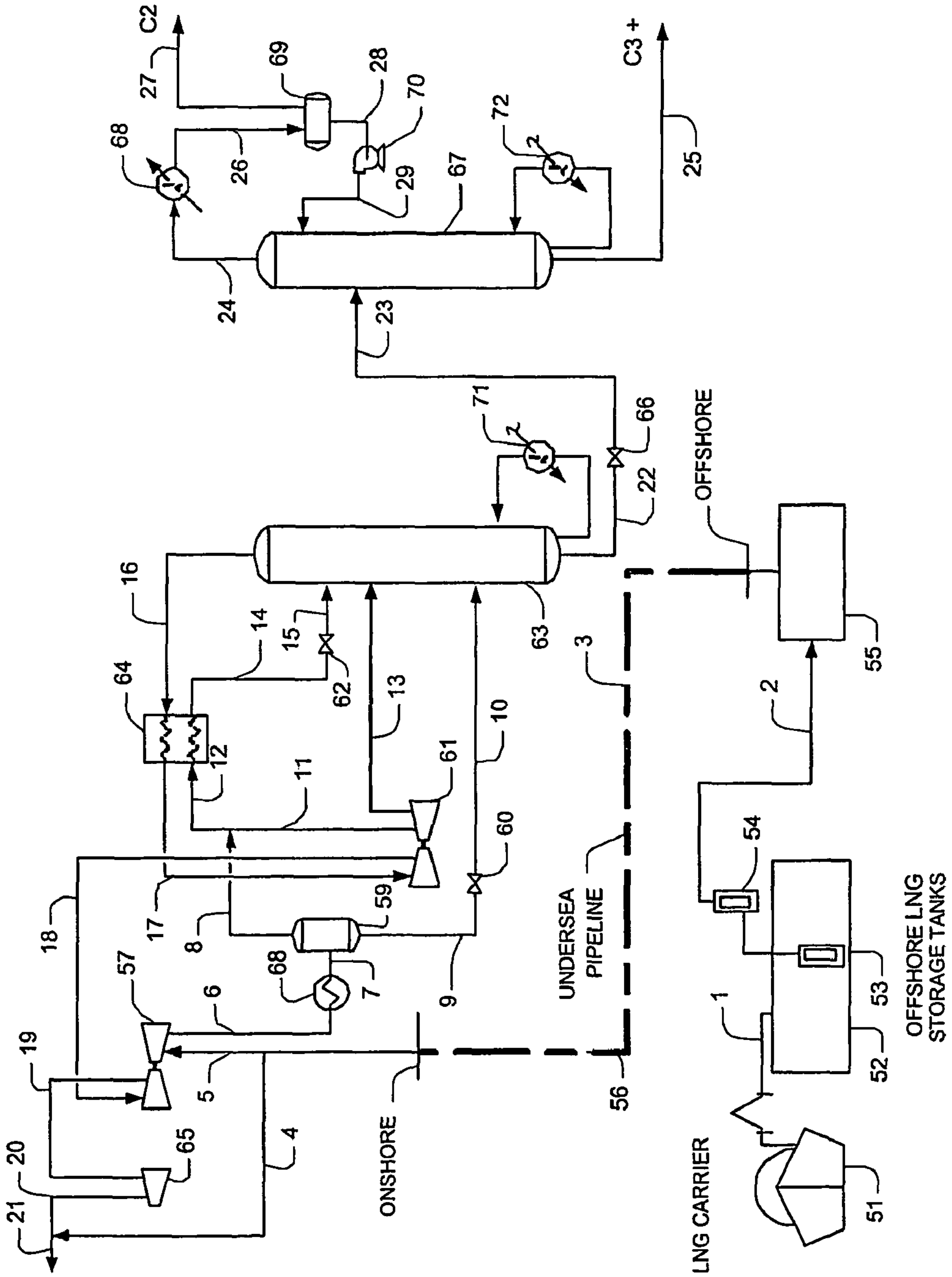
FIG. 1 is one exemplary configuration of offshore LNG regasification with onshore processing using a two-column design.

The inventors have discovered that non-methane components (i.e., those having two or more carbon atoms (C2+)) can be separated from LNG in an economically desirable manner in which the LNG is pumped to supercritical pressure, preferably in an offshore or remote onshore location and in which the supercritical LNG is regasified to an intermediate temperature in the offshore or remote location. The so heated supercritical natural gas is then transferred to a processing unit (e.g., onshore location). Alternatively, at least one of the offshore functions may also be performed onshore.

Depending on the chemical composition of the LNG, a variable fraction of the heated and vaporized natural gas is then processed in an onshore location to form a lean natural gas product that is then combined with another fraction of the heated and vaporized natural gas to thereby produce a sales gas with predetermined composition and/or heating value. Thus, it should be recognized that such configurations may be employed for BTU control of import LNG that fails to meet pipeline specification. Onshore processing will most typically take advantage of the relatively high pressure of the vaporized natural gas, which is expanded in a turboexpander to generate power for recompression of the residue gas, and/or to supply at least part of the refrigeration (cooling) requirements of reflux condensers in downstream fractionation columns (demethanizer and/or deethanizer). Thus, cooling for the separation process is provided by the vaporized LNG, and it should therefore be recognized that the temperature of the vaporized supercritical natural gas will be a function of the non-methane content in the LNG.

In one especially preferred configuration, a portion of the flashed vapor from the first turboexpander is processed in a second turboexpander that is configured for varying levels of BTU reduction (the ratio of turbo expanded to non-turbo expanded vapor will determine the level of C2+ removal). At least part of the power generated by the second turboexpander is used to recompress the residue gas. It should be especially noted that two turboexpanders operating in series can provide significant power to recompress the residue gas to the pipeline pressure. However, where desirable, one or more additional compressors can be added where a high pipeline delivery pressure is required. It is also noted that by bypassing a portion of the onshore vapor around the first turboexpander, the size of the downstream processing unit can be reduced, lowering the capital cost of the onshore BTU reduction unit. Of course, the actual quantity of bypassed material will predominantly depend on the BTU content of the import LNG, the pipeline gas heating value requirement, and/or the desire for C2 and C3+ products.

In such configurations, contemplated plants are built as a two column plant in which a first column operates as a reflux demethanizer that receives two reflux streams, and in which a second column operates as a deethanizer producing an ethane overhead vapor and a bottom C3+ product (i.e., product comprising compounds having three or more carbon atoms). Such configurations will advantageously allow change in component separation and varying levels of BTU control by changing process temperatures and split ratios of the reflux streams.

An exemplary scheme of a two column plant configuration is depicted in FIG. 1. Here, the plant comprises an offshore LNG receiving terminal that receives LNG from an LNG carrier 51. LNG is unloaded from the carrier via unloading arms to the offshore LNG storage tank 52. The LNG storage tanks can be a gravity based structure, or a floating LNG vessel. A typical LNG composition (stream 1) is shown in Table 1. LNG from the storage tanks is pumped by the primary pump 53 to an intermediate pressure, typically at 100 psig. The pressurized LNG is further pumped by the secondary pump 54 to supercritical pressure, typically 1500 psig to 2200 psig forming stream 2. It should be noted that the secondary pump discharge pressure will be typically increased with increasing content of non-methane components in the LNG and/or with increased onshore pipeline gas delivery pressure. The supercritical ING is then heated in LNG vaporizers 55 to an intermediate temperature typically at −10° F. to 10° F., forming stream 3. The intermediate temperature is selected as a function of the LNG composition and the level of BTU reduction. Most typically, stream 3 will have a lower temperature when higher levels of C2+ extraction are required onshore. Conventional LNG vaporizers can be used for the regasification facility, including open rack seawater vaporizers, submerged combustion fuel fired vaporizers, intermediate fluid vaporizers, Rankine cycle vaporizers and/or other suitable heat sources (which may also come from an onshore location). The heated LNG is then transported via an undersea pipeline 56 to the onshore facility.

Therefore, it should be appreciated that contemplated configurations will include an offshore facility comprising a source of LNG and a pump that is fluidly coupled to the source, wherein the pump is configured to produce LNG at supercritical pressure (typically between about 1500 psig and 220 psig, and even higher). A regasification unit is coupled to the pump and configured to regasify the supercritical LNG to a predetermined temperature, wherein a controller (e.g., CPU, or human operator) is operationally linked to the regasification unit and enabled to set the temperature of the regasified LNG as a function of a concentration of non-methane components in the LNG.

Most typically, the LNG source is a LNG carrier, a submerged and/or floating LNG tank. In less preferred aspects, the LNG source may also be a pipeline (preferably undersea pipeline). It should further be appreciated that the regasification unit need not be limited to a specific type, but that all known types and especially those suitable for offshore operation are deemed suitable for use herein. Therefore, contemplated regasification units include open rack seawater vaporizers, submerged combustion fuel fired vaporizers, intermediate fluid vaporizers, Rankine cycle vaporizers, etc. With respect to the temperature of the vaporized supercritical natural gas it should be noted that the particular temperature will depend on the chemical composition of the LNG, and especially on the content of non-methane components in the LNG. However, it is generally preferred that the temperature will be below normal pipeline operating conditions, and especially preferred temperatures are between about −20° F. to about 20° F. However, and especially where the LNG is relatively rich and/or where it is desired to produce a particularly lean sales gas, the temperature may also be between 60° F. and −10° F. Thus, it is generally preferred that the controller has a central processing unit that is programmed to control the temperature as a function of entered or otherwise previously provided information on chemical composition of the LNG. Alternatively, pumping to supercritical pressure and/or vaporization of the supercritical LNG may also be performed in an onshore location using components well known in the art. However, where vaporization is performed onshore, it is generally preferred that the heat for the vaporization is provided at least in part by thermal integration with a power cycle (e.g., using heat exchange fluids coupled to a steam cycle or HRSG).

Alternatively, the LNG source and/or the regasification unit may also be located in an area that is relatively remote from human habitation and/or activity and will provide the onshore facility with the regasified supercritical natural gas. For example, storage and/or regasification may be done in a configuration in which the storage and/or regasification are at least 1 km, more typically at least 5 km, and most typically at least 10 km away from the onshore facility.

Once the supercritical vaporized LNG 3 reaches the onshore facility, stream 3 is split into two portions, stream 4 and stream 5, wherein the ratio between streams is a function of the desired level of BTU reduction (and/or concentration of non-methane components). Stream 4 bypasses the BTU reduction unit and is mixed with residue gas stream 20 forming sales gas stream 21 that is fed to the gas pipeline. Stream 5 is letdown in pressure in a first turboexpander 57 forming stream 6, typically at about 1100 psig and a temperature of about −10° F. to −60° F. The first turboexpander 57 provides a portion of the compression power to operate the residue compressor, which is operationally coupled to the expander. Stream 6 is heated in exchanger 68 to 0° F. to −25° F. to form stream 7 by supplying refrigeration duties for the reflux condenser 68. The two phase stream is separated in the separator 59 into a liquid stream 9 and a vapor stream 8. Vapor stream 8 is further split into stream 11 and stream 12. it should be noted that the split between streams 11 and 12 is adjusted as necessary to meet the varying levels of BTU reduction or C2+ recovery (infra). The liquid stream 9 is letdown in pressure in a JT valve 60 to about 450 psig forming stream 10 that enters the lower section of the first column 63.

When a high C2+ removal is required, the flow of stream 12 relative to stream 11 is increased, resulting in an increase in reflux flow to the overhead exchanger 64 where stream 12 is chilled to typically −90° F. to −110° F. forming stream 14. Stream 14 is then letdown in pressure by JT valve 62 forming stream 15 to about 450 psig to 500 psig and fed to the upper section of the first column (here: operating as a demethanizer). Stream 11 is letdown in pressure to about 450 psig to 500 psig in the second turboexpander 61 forming stream 13, typically at −40° F. to −60° F. and fed to the mid section of column 63. The power generated by the second turboexpander is preferably used to provide a portion of the residue gas compression requirement. The turboexpander 61 also chills the feed gas, supplying a portion of the rectification duty in the first column.

Demethanizer column 63 typically operates between about 450 psig to about 500 psig and produces an overhead stream 16 and a bottom stream 22. It should be noted that the temperatures of these two streams will vary depending on the desired levels of C2+ recovery. For example, during high C2+ recovery, the overhead temperature is preferably maintained at about −110° F. to about −145° F., as needed for recovery of ethane and heavier components. The demethanizer column bottom temperature is maintained by reboiler 71. During lower C2+ recovery, the overhead temperature may be increased to about −80° F. to about −100° F., as needed in rejecting some of the C2 components overhead. The refrigerant content in the first column overhead stream 16 is recovered in heat exchanger 64 by providing cooling to the reflux stream 12. The so heated stream 17 is then compressed by the compressor that is operationally coupled to the second turboexpander forming stream 18, typically at −10° F. to −30° F., which is further compressed by the residue gas compressor driven by the first turboexpander to form stream 19 at about 900 psig to 1200 psig. Where desirable, additional recompression with compressor 65 can be used to boost the residue gas pressure to the sales gas pipeline pressure forming stream 20 that is then mixed with bypass stream 4.

The first column bottom stream 22 is letdown in pressure by JT valve 66 to about 200 to 400 psig forming stream 23 prior to entering the upper section of the second distillation column 67, the deethanizer. The deethanizer is of a conventional column design that produces a C2 rich overhead vapor stream 24 and a C3+ bottom product stream 25. The overhead vapor 24 is condensed in reflux condenser 68, with cooling supplied by the feed gas stream 6. The chilled overhead stream 26 is separated in the reflux drum 69 into an ethane product stream 27 and a liquid stream 28 that is further pumped by pump 70 forming stream 29 to be refluxed to the deethanizer column. Heating requirement in the deethanizer column is supplied with reboiler 72 using an external heat source. The overall material balance for the BTU reduction unit is shown in Table 1.

Therefore, the inventors contemplate a method of providing a natural gas product that includes the steps of (1) providing vaporized supercritical LNG, preferably from offshore to an onshore terminal; (2) splitting the vaporized supercritical LNG into a first and second stream; (3) processing the first stream to remove at least some non-methane components from the first stream to form a lean natural gas product, wherein the step of processing includes a first turbo-expansion of at least a portion of the first stream; (4) compressing the lean natural gas product using at least in part energy from the first turbo-expansion; and (5) combining the compressed lean natural gas product with the second stream to thereby form a sales gas with predetermined content of non-methane components.

As already discussed above, preferred steps of providing the vaporized supercritical LNG includes vaporizing the supercritical LNG to a predetermined temperature, wherein the temperature is a function of a concentration of non-methane components in the LNG. Similarly, the step of splitting the vaporized supercritical LNG in first and second streams is a function of a concentration of non-methane components in the LNG. Most preferably, the step of processing further includes a second turbo-expansion of at least a portion of the first stream, wherein the first turbo-expansion provides reflux condenser duty, and wherein the second turbo-expansion provides refrigeration duty in the absorber.

Therefore, particularly preferred plants will include a portion (preferably offshore) configured to pump LNG to supercritical pressure and to regasify the pressurized LNG, and an onshore portion configured to process one portion of the regasified LNG to remove at least a portion of non-methane content in the LNG to thereby form a lean natural gas product. In such plants, the onshore portion is typically further configured to produce a sales gas from a mixture of the lean natural gas product and another portion of the regasified LNG. Viewed from a different perspective, a plant is also contemplated having an offshore source that provides regasified LNG at supercritical pressure, wherein the LNG has a first quantity of non-methane components. An onshore flow divider is configured to produce a first and a second stream from the regasified LNG, and an onshore absorber is configured to produce a lean natural gas product from a turbo-expanded portion of the first stream. Such plants will further include an onshore compressor that compresses the lean natural gas product, wherein the compressor is configured to use energy from the turbo-expansion of the first stream, and an onshore flow combining element that is configured to produce a sales gas from the compressed lean natural gas product and the second stream, wherein the sales gas has a quantity of non-methane components that is less than the first quantity. As discussed above, it is generally preferred that a control unit (e.g., human operator, or device comprising a CPU and programmed to operate without manual or user intervention) that is configured to control the temperature of the regasified LNG and/or the ratio of first and second streams at the flow divider, wherein the temperature and/or the ratio are set as a function of a concentration of non-methane in the regasified LNG.

In another preferred configuration, the BTU reduction unit includes three columns, with the first column (here: absorber) operates at a higher pressure than the second column, and wherein the bottom liquid from the absorber is let down in pressure (e.g., via Joule-Thompson valve) and fed to the second column. It should be appreciated that by operating the first column at a higher pressure, the residue gas compression horsepower can be significantly reduced, especially when relatively high pipeline gas pressure is required. It should also be appreciated that the reduction in pressure of the first bottom product supplies a portion of the refrigeration for rectification function to the second column (typically via JT effect) which operates as a demethanizer. The overhead vapor from the second column is compressed in a recycle compressor and returned to the first column. The third column then operates as a deethanizer at yet lower pressure than the first and second column producing an ethane overhead vapor and bottom C3+ products.

It should be especially noted that the overhead vapor from the second column is split into two portions. The first portion is chilled in a reflux exchanger with overhead vapor from the absorber to thereby form a cold reflux to the top section of the first column (absorber). The second portion of the overhead vapor forms a stripping gas that is fed to the bottom of the first column. Using such split flow configurations, it is pointed out that ratio of the first portion to the second vapor portion from the second distillation column can be used to control in large part the desired level of C2+ recovery.

Figure 2:
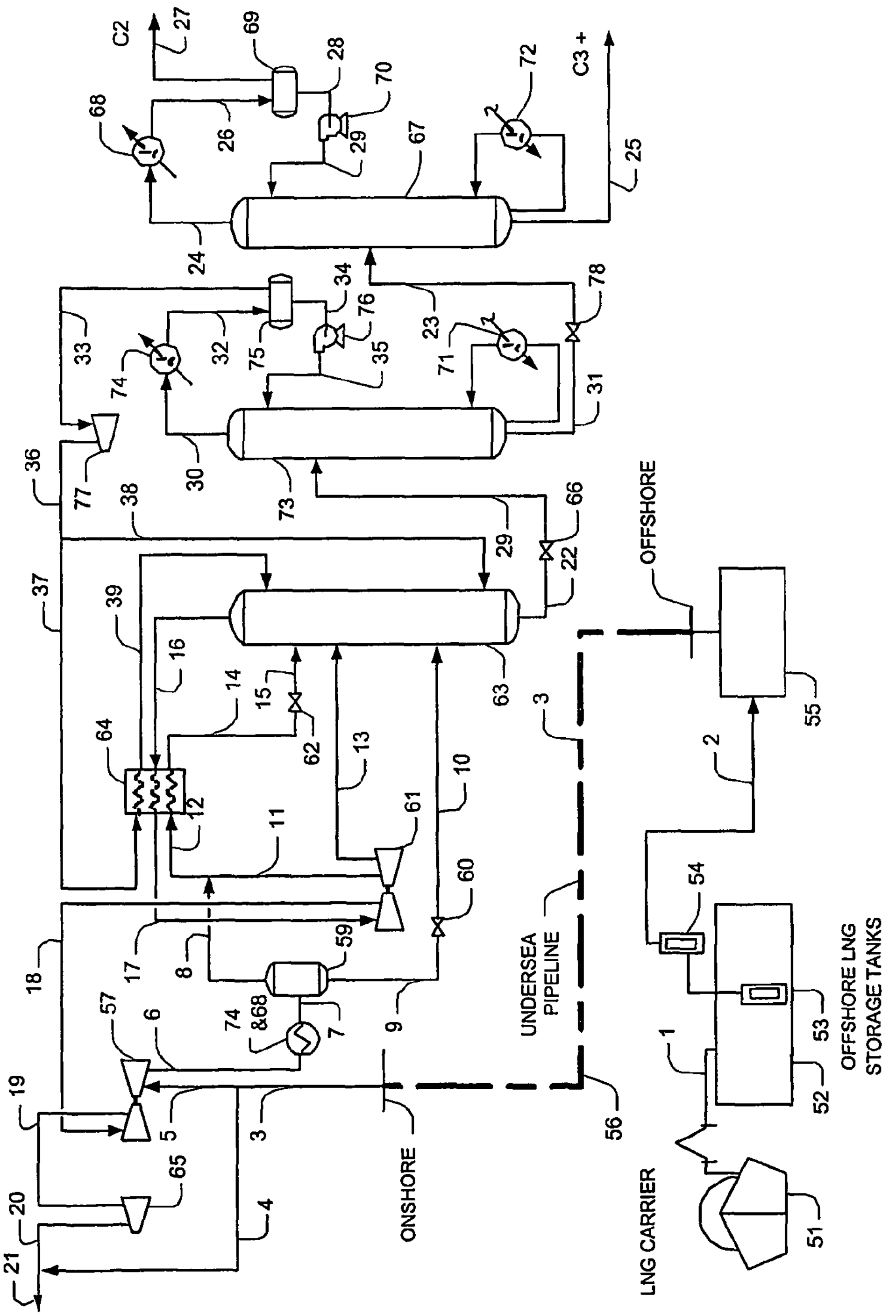
FIG. 2 is another exemplary configuration of offshore LNG regasification with onshore processing using a three-column design.

One exemplary schematic of such configurations is depicted in FIG. 2. Here, the plant comprises an offshore LNG receiving terminal that receives LNG from an LNG carrier 51. LNG is unloaded from the carrier via unloading arms to the offshore LNG storage tank 52. The LNG storage tanks can be a gravity based structure, or a floating LNG vessel. As before, a typical LNG composition (stream 1) is shown in Table 2. LNG from the storage tanks is pumped by the primary pump 53 to an intermediate pressure, typically at 100 psig. The pressurized LNG is further pumped by the secondary pump 54 to supercritical pressure, typically 1500 psig to 2200 psig forming stream 2. It should be noted that the secondary pump discharge pressure is typically raised with increasing richness of the import LNG and/or onshore pipeline gas delivery pressure.

The supercritical LNG is then heated in LNG vaporizers 55 to an intermediate temperature typically at −10° F. to 10° F., forming stream 3. The intermediate temperature is dependent on the LNG composition and the level of BTU reduction, and generally, lower temperature is required when higher level of C2+ extraction is required onshore. Conventional LNG vaporizers can be used for the regasification facility, including open rack seawater vaporizers, submerged combustion fuel fired vaporizers, intermediate fluid vaporizers, Rankine cycle vaporizers, or other suitable heat sources. The heated LNG is then transported via an undersea pipeline 56 to the onshore facility.

Once the supercritical LNG reaches the onshore facility, stream 3 is split into two portions, stream 4 and stream 5, with the split ratio determined by the level of BTU reduction requirement. Stream 4 bypasses the BTU reduction unit and is mixed with the residue gas stream 20 forming stream 21 that is fed to the gas pipeline. Stream 5 is letdown in pressure in the first turboexpander 57 forming stream 6, typically at 1100 psig and −20° F. to −60° F. The first turboexpander 57 provides a portion of the compression power to operate the residue compressor. Stream 6 is heated to 0° F. to −25° F. forming stream 7 by supplying the refrigeration duties for the reflux condensers 68 and 74. The two phase stream is separated in the separator 59 into a liquid stream 9, and a vapor stream 8 that is further split into stream 11 and stream 12. The split is adjusted as necessary to meet the varying levels of BTU reduction or C2+ recovery (infra). The liquid stream 9 is letdown in pressure in a JT valve 60 to about 600 psig forming stream 10 that enters the lower section of the first column 63.

When high C2+ removal is required, the ratio of stream 12 to stream 11 is increased, resulting in an increase in reflux flow to the overhead exchanger 64. Stream 12 is chilled to typically −90° F. to −110° F. in exchanger 64 forming stream 14, and is letdown in pressure by JT valve 62 forming stream 15, to about 400 psig to 650 psig and fed to the upper section of the first column (here: absorber). Stream 11 is letdown in pressure to about 400 psig to 650 psig in the second turboexpander 61 forming stream 13, typically at −40° F. to −60° F. and fed to the mid section of column 63. The power generated by the second turboexpander is preferably used to provide a portion of the residue gas compression requirement. The turboexpansion also provides for chilling the feed gas, thus supplying a portion of the rectification duty in the first column.

The first column is also fed by the recycle stream 37 and stream 38 from the second column. By adjusting the ratio between these two streams, C2 and C3 recoveries can be adjusted as needed. The first column operating between 400 psig to 650 psig produces an overhead stream 16 and a bottom stream 22. The temperatures of these two streams vary depending on the levels of C2+ recovery. For example, during high C2+ recovery, the overhead temperature must be maintained at −110° F. to −145° F., as needed for recovery of the ethane and heavier components. During lower C2+ recovery, the overhead temperature is increased to about −80° F. to −100° F., as needed in rejecting some of the C2 components overhead. The refrigerant content in the first column overhead stream 16 is recovered in heat exchanger 64 by providing cooling to the first and second reflux streams 37 and 12 to thereby form streams 39 and 14, respectively. The heated stream 17 is compressed by a compressor that is at least in part driven by the second turboexpander 61 forming stream 18, typically at −10° F. to −30° F. and is further compressed by the residue gas compressor driven by the first turboexpander 57 forming stream 19 at about 900 psig to 1200 psig. As an option, additional recompression with compressor 65 can be used to boost the residue gas pressure to the sales gas pipeline pressure forming stream 20 that can be mixed with the bypass stream 4.

The first column bottom stream 22 is letdown in pressure by JT valve 66 to about 200 to 400 psig forming stream 29 prior to entering the upper section of the second distillation column 73. Distillation column 73 operates at about 200 to 400 psig serving as a demethanizer fractionating stream 29 into C2+ bottom 31 and a C1 rich overhead stream 30. The overhead vapor is condensed using refrigeration from the inlet feed stream 6 in reflux exchanger 74, forming stream 32 at about 0° F. to −40° F. Stream 32 is separated in reflux drum 75 into a liquid stream 34 and a vapor stream 33. The liquid stream 34 is pumped by reflux pump 76 forming stream 35 and returned to the top of the second column 73 as reflux.

The vapor stream 33 is compressed by compressor 77 forming stream 36 which is split into stream 37 and 38, and routed to exchanger 64 providing reflux and/or to the bottom of the first column for ethane re-absorption. Heating requirement in the second column is supplied with reboiler 71 using an external heat source. The temperature of the NGL bottom product ranges from 100° F. to 200° F. depending on the level of BTU reduction. The second column bottom is sent to the third column 67 (after expansion in JT valve 78 via stream-23), which is operated as a deethanizer for further fractionation.

The deethanizer is typically of a conventional column design that produces a C2 rich overhead vapor stream 24 and a C3+ bottom product stream 25. The overhead vapor is condensed in reflux condenser 68, with cooling supplied by the feed gas stream 6. The chilled overhead stream 26 is separated in the reflux drum 69 into an ethane product stream 27 and a liquid stream 28 that is further pumped by pump 70 forming stream 29 to be refluxed to the deethanizer column. Heating requirement in the deethanizer column is supplied with reboiler 72 using an external heat source, and heating requirements of column 73 is supplied with reboiler 71 using an external heat source. The overall material balance for the BTU reduction unit is shown in Table 2.

Thus, specific embodiments and applications for LNG regasification and BTU control have been disclosed. It should be apparent, however, to those skilled in the art that many more modifications besides those already described are possible without departing from the inventive concepts herein. For example, the offshore portion of contemplated configurations and methods may also be positioned and/or operated in part or in toto onshore. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Furthermore, where a definition or use of a term in a reference, which is incorporated by reference herein is inconsistent or contrary to the definition of that term provided herein, the definition of that term provided herein applies and the definition of that term in the reference does not apply.

TABLE 1

| Stream Number | LNG 1 | ETHANE 27 | LPG 25 | RESIDUE GAS 21 |
|---|---|---|---|---|
| N2 | 0.0034 | 0.0000 | 0.0000 | 0.0037 |
| C1 | 0.8976 | 0.0216 | 0.0000 | 0.9833 |
| C2 | 0.0501 | 0.9584 | 0.0100 | 0.0116 |
| C3 | 0.0316 | 0.0200 | 0.6277 | 0.0012 |
| iC4 | 0.0069 | 0.0000 | 0.1442 | 0.0001 |
| NC4 | 0.0103 | 0.0000 | 0.2160 | 0.0001 |
| C5 | 0.0001 | 0.0000 | 0.0021 | 0.0000 |
| MMscfd | 1,200 | 49 | 57 | 1,094 |
| BPD | 513,848 | 30,827 | 39,374 | 443,647 |
| HHV, Btu/Scf | 1123 | 1756 | 2765 | 1009 |

TABLE 2

| Stream Number | LNG 1 | ETHANE 27 | LPG 25 | RESIDUE GAS 21 |
|---|---|---|---|---|
| N2 | 0.0034 | 0.0000 | 0.0000 | 0.0036 |
| C1 | 0.8976 | 0.0000 | 0.0000 | 0.9625 |
| C2 | 0.0501 | 0.9800 | 0.0200 | 0.0308 |
| C3 | 0.0316 | 0.0200 | 0.6144 | 0.0027 |
| iC4 | 0.0069 | 0.0000 | 0.1449 | 0.0002 |
| NC4 | 0.0103 | 0.0000 | 0.2185 | 0.0001 |
| C5 | 0.0001 | 0.0000 | 0.0021 | 0.0000 |
| MMscfd | 1,200 | 24 | 56 | 1,119 |
| BPD | 513,848 | 15,571 | 38,761 | 459,087 |
| HHV, Btu/Scf | 1123 | 1773 | 2760 | 1027 |

What is claimed is:

1. A method of providing a natural gas product, comprising:

providing vaporized supercritical LNG, optionally from an offshore location to an onshore terminal;

splitting the vaporized supercritical LNG into a first and second stream;

processing the first stream to remove at least some non-methane components from the first stream to form a lean natural gas product, wherein the step of processing includes a first turbo-expansion of at least a portion of the first stream;

compressing the lean natural gas product using at least in part energy from the first turbo-expansion; and combining the compressed lean natural gas product with the second stream to thereby form a sales gas with predetermined content of non-methane components.

2. The method of claim 1 wherein the step of providing the vaporized supercritical LNG includes vaporizing the supercritical LNG to a predetermined temperature of equal or less than 20° F., wherein the temperature is a function of a concentration of non-methane components in the LNG.

3. The method of claim 1 wherein in the step of splitting the vaporized supercritical LNG in first and second streams is a function of a concentration of non-methane components in the LNG.

4. The method of claim 1 wherein the first stream is processed in an absorber that further produces an absorber bottom product, and wherein the bottom product is further processed in at least one downstream column to thereby produce at least one of an ethane product and a propane and heavier product.

5. The method of claim 4 wherein the at least one downstream column is operated at a pressure that is lower than an operating pressure of the absorber.

6. The method of claim 4 wherein the at least one downstream column is operated as a demethanizer or deethanizer and provides an overhead product that is recycled to the absorber as at least one of a reflux stream and a bottom product.

7. The method of claim 1 wherein the step of processing further includes a second turbo-expansion of the at least portion of the first stream, wherein the first turbo-expansion provides reflux condenser duty of downstream columns, and wherein the second turbo-expansion provides refrigeration duty in the absorber for recovery of the non-methane components.

8. A facility comprising:

a source of LNG and a pump fluidly coupled to the source, wherein the pump is configured to produce LNG at supercritical pressure;

a regasification unit coupled to the pump and configured to regasify the supercritical LNG to a predetermined temperature; and a controller operationally linked with the regasification unit and enabled to set the temperature of the regasified LNG as a function of a concentration of non-methane components in the LNG.

9. The facility of claim 8 wherein the LNG source is selected from the group consisting of a LNG carrier, a submerged LNG tank, and a floating LNG tank.

10. The facility of claim 8 wherein the regasification unit comprises a unit selected from the group consisting of an open rack seawater vaporizer, a submerged combustion fuel fired vaporizer, an ambient air vaporizer, an intermediate fluid vaporizer, and a Rankine cycle vaporizer.

11. The facility of claim 8 wherein the predetermined temperature is between about −20° F. to about 20° F.

12. The facility of claim 8 wherein the controller comprises a central processing unit programmed to control the temperature as a function of previously provided information on chemical composition of the LNG.

13. A LNG processing plant comprising:

a portion, optionally offshore, configured to pump LNG to supercritical pressure and to regasify the pressurized LNG;

an onshore portion configured to process one portion of the regasified LNG to remove at least a portion of non-methane content in the LNG to thereby form a lean natural gas product; and wherein the onshore portion is further configured to produce a sales gas from the lean natural gas product and another portion of the regasified LNG.

14. The LNG processing plant of claim 13 wherein the onshore portion comprises an absorber that receives the one portion of the regasified LNG to thereby produce the lean natural gas.

15. The LNG processing plant of claim 14 further comprising a turbo-expander that expands the one portion of the regasified LNG before entry into the absorber, and further comprising a compressor that is operationally coupled to the expander and compresses the lean natural gas product.

16. The LNG processing plant of claim 14 further comprising a downstream column that is configured to receive an absorber bottom product and to produce an ethane and propane and heavier product.

17. The LNG processing plant of claim 14 further comprising a downstream column that is configured to operate as a demethanizer or deethanizer, to receive an absorber bottom product, and to produce at least one of a reflux stream and a bottom feed stream to the absorber.

18. The LNG processing plant of claim 14 further comprising a flow combining element that is configured to combine the lean natural gas product and the another portion of the regasified LNG to thereby form the sales gas.

19. A LNG processing plant comprising:

a source that provides regasified LNG at supercritical pressure, wherein the LNG has a first quantity of non-methane components;

a flow divider that is configured to produce a first and a second stream from the regasified LNG;

an absorber that is configured to produce a lean natural gas product from a turbo-expanded portion of the first stream;

a compressor that compresses the lean natural gas product, wherein the compressor is configured to use energy from the turbo-expansion of the first stream; and a flow combining element that is configured to produce a sales gas from the compressed lean natural gas product and the second stream, wherein the sales gas has a quantity of non-methane components that is less than the first quantity.

20. The plant of claim 19 further comprising a control unit that is configured to control at least one of a temperature of the regasified LNG and a ratio of first and a second streams, wherein the temperature and the ratio are set as a function of a concentration of non-methane in the regasified LNG.

* * * * *